United States Patent
Yamada

(10) Patent No.: US 8,881,554 B2
(45) Date of Patent: Nov. 11, 2014

(54) OPTICAL FIBER PREFORM MANUFACTURING APPARATUS AND OPTICAL FIBER PREFORM MANUFACTURING METHOD

(75) Inventor: Naritoshi Yamada, Sakura (JP)

(73) Assignee: Fujikura Ltd., Tokyo (JP)

( * ) Notice: Subject to any disclaimer, the term of this patent is extended or adjusted under 35 U.S.C. 154(b) by 124 days.

(21) Appl. No.: 13/195,551

(22) Filed: Aug. 1, 2011

(65) Prior Publication Data

US 2012/0024012 A1   Feb. 2, 2012

(30) Foreign Application Priority Data

Aug. 2, 2010 (JP) ................... 2010-173902

(51) Int. Cl.
  C03B 37/018  (2006.01)
  C03B 37/014  (2006.01)
(52) U.S. Cl.
  CPC ................... C03B 37/01406 (2013.01)
  USPC .......................................................... 65/413
(58) Field of Classification Search
  USPC ........................................... 65/413, 414, 421
  See application file for complete search history.

(56) References Cited

U.S. PATENT DOCUMENTS

2002/0194879 A1* 12/2002 Takei et al. ..................... 65/413

FOREIGN PATENT DOCUMENTS

| CN | 1496968 A | | 5/2004 |
| CN | 1291935 C | | 12/2006 |
| JP | 02289438 A | * | 11/1990 |
| JP | 7-300332 A | | 11/1995 |
| JP | 09188523 A | * | 7/1997 |
| JP | 09-286629 A | | 11/1997 |
| JP | 2003-073131 A | | 3/2003 |
| JP | 3691600 B2 | | 6/2005 |
| JP | 2008127260 A | * | 6/2008 |

OTHER PUBLICATIONS

Office Action issued by the Japanese Patent Office in Japanese Application No. 2010-173902 dated Jul. 17, 2012.
Office Action issued by the Japanese Patent Office in Japanese Application No. 2010-173902 dated Oct. 9, 2012.
Chinese Office Action issued by the Chinese Patent Office in Chinese Patent Application No. 201110219299.6 dated Aug. 5, 2013.

* cited by examiner

Primary Examiner — Queenie Dehghan
(74) Attorney, Agent, or Firm — Sughrue Mion, PLLC

(57) ABSTRACT

An optical fiber preform manufacturing apparatus includes a booth, a reaction chamber disposed inside the booth, a target member disposed within the reaction chamber, a burner that deposits glass particles on the target member, a partition plate that partitions the internal space of the booth into a first space where the reaction chamber and the burner are disposed and a second space, and that has a plurality of through holes that allows the first space and the second space to communicate with each other, an air supply unit that supplies clean air into the first space; and an exhaust unit that discharges air within the second space.

6 Claims, 4 Drawing Sheets

OPTICAL FIBER PREFORM MANUFACTURING APPARATUS AND OPTICAL FIBER PREFORM MANUFACTURING METHOD

Priority is claimed on Japanese Patent Application No. 2010-173902, filed Aug. 2, 2010, the contents of which are incorporated herein by reference.

BACKGROUND OF THE INVENTION

1. Field of the Invention

The present invention relates to an optical fiber preform manufacturing apparatus and an optical fiber preform manufacturing method.

2. Description of the Related Art

As methods of manufacturing an optical fiber preform, the VAD method or the outside vapor phase deposition method is known.

FIG. 7 is a vertical cross-sectional view showing the schematic configuration of a conventional optical fiber preform manufacturing apparatus using the VAD method.

As shown in FIG. 7, an optical fiber preform manufacturing apparatus 101 includes a reaction chamber 110, a target member 120, a core burner 130, and a cladding burner 140.

The target member 120 is provided within the reaction chamber 110.

The core burner 130 and the cladding burner 140 deposit glass particles at the tip (lower part) of the target member 120 in the axial direction.

In addition, the related-art optical fiber preform manufacturing apparatus using the outside vapor phase deposition method is not provided with the core burner 130, and includes only the cladding burner 140.

The target member 120 is a rod-shaped member formed from, for example, quartz, extends in the vertical direction, and is provided within the reaction chamber 110.

The target member 120 is supported by a column 122 via a holding portion 121.

The column 122 is provided with a drive device (not shown in the drawings) that rotates the target member 120 around the central axis thereof and moves the target member in the direction of the central axis.

The core burner 130 is a burner that deposits glass particles used in order to form a core at the tip (lower part) of the target member 120 in the axial direction, and produces core soot S1.

The cladding burner 140 is a burner that deposits glass particles used in order to form cladding at an outer periphery of the core soot S1, and produces cladding soot S2.

By producing the core soot S1 and the cladding soot S2 in the axial direction at the tip (lower part) of the target member 120, an optical fiber porous preform S (hereinafter simply referred to as a porous preform S) is manufactured.

An optical fiber preform is fabricated by subjecting the manufactured porous preform S to dehydration processing and transparent vitrification by heating.

Moreover, after deficient cladding is adjusted if needed, an optical fiber is manufactured by drawing an optical fiber preform.

It is required that as few air bubbles as possible are present inside an optical fiber preform to be manufactured.

This is required in order to prevent a situation in which air bubbles reduce the strength of the optical fiber after drawing and increases the transmission loss of light.

As a cause of the generation of air bubbles within the optical fiber preform, for example, the mixing of dust into the porous preform S during manufacture is an exemplary example.

In order to suppress generation of air bubbles, a reaction chamber is disposed inside a booth, and clean air is introduced into the booth, thereby reducing dust within the reaction chamber (for example, refer to Japanese Unexamined Patent Application, First Publication No. H7-300332).

That is, as shown in FIG. 7, the optical fiber preform manufacturing apparatus 101 is provided with a booth 150 in which a reaction chamber 110 is disposed, an air supply device 160 for supplying clean air into the booth 150, and an exhaust device 180 that discharges air in the reaction chamber 110 to the outside.

In addition, the exhaust device 180 is coupled to a reaction chamber exhaust port 111 formed in the reaction chamber 110.

By operating the air supply device 160, clean air is supplied into the booth 150.

A side wall of the reaction chamber 110 is provided with an opening having a greater diameter than the diameter of the cladding burner 140, and the cladding burner 140 is fitted into the opening.

The clean air supplied into the booth 150 from a gap between the opening and the cladding burner 140 flows into the reaction chamber 110.

Since air within the reaction chamber 110 is discharged to the outside by the operation of the exhaust device 180, the clean air supplied into the booth 150 is discharged to the outside through the inside of the reaction chamber 110.

Accordingly, the optical fiber preform manufacturing apparatus 101 including the booth 150, the air supply device 160, and the exhaust device 180 can reduce the amount of dust in the reaction chamber 110.

Hence, a certain advantage that the amount of dust mixed into the porous preform S can be reduced, and air bubbles in an optical fiber preform can be suppressed is obtained.

However, since a worker enters the booth 150 and works during the maintenance of the optical fiber preform manufacturing apparatus 10, dust is generated within the booth 150.

Additionally, the glass particles that have not been deposited on the target member 120 adhere to the inside of the reaction chamber 110, or soot cracking of the porous preform S during manufacture occurs, whereby soot powder is generated.

For this reason, it is necessary to clean the reaction chamber 110 or the booth 150.

The cleaning work is also performed within the booth 150 by a worker.

Dust, such as soot powder generated during maintenance or cleaning, adheres to the inside (particularly, a floor surface 151) of the booth 150.

When manufacture of the porous preform S is again started after maintenance or cleaning, there is a possibility that the flow of air will be generated within the booth 150 by the operation of the air supply device 160, and the dust adhering to the inside of the booth 150 will be lifted.

Additionally, since the exhaust device 180 discharges air within the reaction chamber 110 via the reaction chamber exhaust port 111, the flow of air that goes into the reaction chamber 110 is generated from the inside of the booth 150.

As the lifted dust flows along such air flow, this dust enters the reaction chamber 110, and is mixed into the porous preform S during manufacture.

That is, there is a problem in that the number of air bubbles within a manufactured optical fiber preform increases after maintenance or cleaning.

Additionally, since an increase in air bubbles within the optical fiber preform is seen, manufacture cannot be resumed during a certain period of time after maintenance or cleaning is performed.

Therefore, there is a problem in that the processing capacity of the optical fiber preform manufacturing apparatus 101 declines.

SUMMARY OF THE INVENTION

The invention has been made in view of these actual circumstances of the related-art, and the object thereof is to provide an optical fiber preform manufacturing apparatus and an optical fiber manufacturing method that can discharge dust within a booth without being passed to the inside of a reaction chamber, and can suppress dust from entering into the reaction chamber, thereby suppressing the generation of air bubbles in an optical fiber preform.

An optical fiber preform manufacturing apparatus of a first aspect of the invention includes a booth, a reaction chamber disposed inside the booth, a target member disposed within the reaction chamber, a burner that deposits glass particles on the target member, a partition plate that partitions the internal space of the booth into a first space where the reaction chamber and the burner are disposed and a second space, and that has a plurality of through holes that allows the first space and the second space to communicate with each other, an air supply unit that supplies clean air into the first space, and an exhaust unit that discharges air within the second space.

In the optical fiber preform manufacturing apparatus of the first aspect of the invention, it is preferable that the first space and the second space be arranged in order toward the direction of gravitational force.

In the optical fiber preform manufacturing apparatus of the first aspect of the invention, it is preferable that an air supply port, the burner, and the partition plate be disposed such that the flow of the air be supplied to the first space through the air supply port from the air supply unit, passes through a position where the burner be arranged, passes through the plurality of through holes in the partition plate, and be introduced into the second space.

In the optical fiber preform manufacturing apparatus of the first aspect of the invention, it is preferable that the optical fiber preform manufacturing apparatus further include a plurality of the burners.

Additionally, it is preferable that a part of the burners is disposed at the partition plate via a first supporting member, and the first supporting member includes an elastic member.

In the optical fiber preform manufacturing apparatus of the first aspect of the invention, it is preferable that the optical fiber preform manufacturing apparatus further include a plurality of the burners.

Additionally, it is preferable that a part of the burners be fixed to an inner surface of the booth that form the second space via a second supporting member.

In the optical fiber preform manufacturing apparatus of the first aspect of the invention, it is preferable that the optical fiber preform manufacturing apparatus further include a plurality of the burners.

Additionally, it is preferable that a part of the burners be fixed to a rigid member disposed outside the booth via a third supporting member.

In the optical fiber preform manufacturing apparatus of the first aspect of the invention, it is preferable that the optical fiber preform manufacturing apparatus further include a plurality of the burners.

Additionally, it is preferable that a part of the burners be fixed to an outer surface of the reaction chamber via a fourth supporting member.

In an optical fiber preform manufacturing method of a second aspect of the invention, the above optical fiber preform manufacturing apparatus is used to pass the air through a position where the burner is disposed after being supplied to the first space, pass the air through the plurality of through holes in the partition plate, and manufacture an optical fiber preform while introducing the air into the second space.

When maintenance or cleaning of the optical fiber preform manufacturing apparatus is performed, a worker performs maintenance and cleaning of the reaction chamber within the booth.

Additionally, soot cracking may occur in the porous preform manufactured within the reaction chamber.

In such a case, since soot particulates, i.e., soot powder, are generated, it is necessary to clean the generated soot powder.

By maintenance and cleaning, dust, such as soot powder, is generated within the booth, and the generated dust adheres to the partition plate in the booth.

In this state, when manufacture of the porous preform is started, and clean air is supplied to the first space from the air supply device, there is a possibility that the flow of air is generated within the first space, and the dust adhering to the partition plate is lifted.

However, the partition plate in the invention is formed with the plurality of through holes.

Moreover, since the optical fiber preform manufacturing apparatus is provided with the exhaust unit that discharges air within the second space, the flow of air that goes to the second space from the first space through the plurality of through holes is generated by the operation of this exhaust unit.

That is, most of the air within the first space can be made to flow to the second space without being passed into the reaction chamber.

Even in a case where the dust adhering to the top face of the partition plate is lifted, the dust flows along with the flow of air that goes to the second space from the first space, and the dust moves to the second space through the plurality of through holes.

Accordingly, even in a case where manufacture of the porous preform is started in a state where the dust has adhered to the partition plate, the amount of dust that enters the reaction chamber, and mixing of dust into the porous preform during manufacture can be suppressed.

As described above, in an optical fiber preform obtained as transparent glass by heating the porous preform, there is an advantage in that generation of air bubbles within the optical fiber preform can be suppressed.

DETAILED DESCRIPTION OF THE INVENTION

Figure 1:
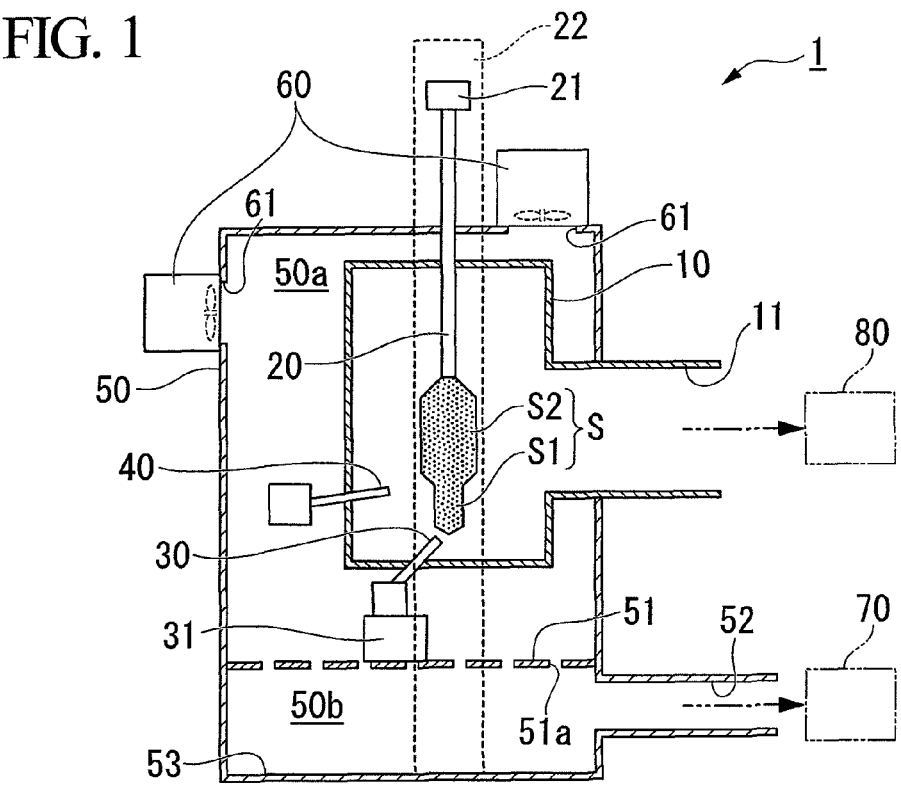
FIG. 1 is a vertical cross-sectional view showing the schematic configuration of an optical fiber preform manufacturing apparatus using a VAD method in a first embodiment of the invention.

An optical fiber preform manufacturing apparatus and an optical fiber manufacturing method related to the invention will be described below in detail, referring to the drawings.

In addition, in the drawings to be used in the following description, chief parts may be shown in an enlarged manner for convenience sake in, order to make the features of the invention easily understood.

The dimension ratios of respective constituent elements are not limited to being the same as the actual dimension ratios.

<First Embodiment>

FIG. 1 is a vertical cross-sectional view showing the schematic configuration of an optical fiber preform manufacturing apparatus 1 using a VAD method, in the present embodiment.

In addition, the up-and-down direction on the sheet in FIG. 1 indicates a vertical direction.

As shown in FIG. 1, the optical fiber preform manufacturing apparatus 1 is an apparatus that manufactures an optical fiber porous preform S (hereinafter simply referred to as a "porous preform S"), and includes a reaction chamber 10, a target member 20, a core burner 30 (burner), a cladding burner 40 (burner), a booth 50, an air supply device 60 (air supply unit), a first exhaust device 70 (exhaust unit), and a second exhaust device 80.

A porous preform S to be manufactured is disposed inside the reaction chamber 10.

An opening (not shown) is formed in the reaction chamber 10, and the space inside the reaction chamber 10 communicates with the outer space.

Additionally, the reaction chamber 10 is provided with a reaction chamber exhaust port 11.

The reaction chamber exhaust port 11 is a ventilation hole for discharging the gas within the reaction chamber 10 toward the outside.

In addition, although quartz or metal is generally used as the material for the reaction chamber 10, SUS (stainless steel) or aluminum may be used.

The target member 20 is a rod-shaped member that is provided within the reaction chamber 10 and extends in the vertical direction, and the porous preform S is manufactured in the axial direction at the tip (lower part) of the target member.

In addition, the target member 20 is disposed so as to protrude partially from the reaction chamber 10.

The target member 20 is fabricated using, for example, quartz.

The target member 20 is supported by a column 22 (rigid member) via a holding portion 21.

The column 22 is provided with a drive device (not shown) that rotates the target member 20 around the central axis thereof and moves the target member in the direction of the central axis.

The column 22 is a columnar rigid member that extends in the vertical direction and is installed outside a booth 50.

The core burner 30 is used in order to deposit glass particles at the tip (lower part) of the target member 20 in the axial direction, and produce core soot S1.

A nozzle tip of the core burner 30 is disposed to protrude into the reaction chamber 10 from an opening provided in the reaction chamber 10, and is installed obliquely upward.

A glass source gas that is a raw material for producing glass particles, such as silicon tetrachloride (SiCl4) or a germanium tetrachloride (GeCl4), a fuel gas, such as hydrogen, an oxygen gas used for combustion of the fuel gas, and a carrier gas containing an inert gas, such as argon, are supplied to the core burner 30.

In addition, in order to adjust a refractive index profile produced in an optical fiber, the compositions of the glass source gases supplied to the core burner 30 and the cladding burner 40 as will be described below are different from each other, and a raw material for a dopant, such as germanium tetrachloride (GeCl4), is supplied to the core burner 30.

In the core burner 30, glass particles are produced by an oxidation reaction or a hydrolysis reaction from the glass source gas within a combustion gas produced by combustion of the fuel gas and the oxygen gas.

The cladding burner 40 is used to deposit the glass particles at the outer periphery of the core soot S1, and produce cladding soot S2.

In addition, the porous preform S is formed from the core soot S1 and the cladding soot S2.

The cladding burner 40 is disposed vertically above the core burner 30.

A nozzle tip of the cladding burner 40 is disposed to protrude into the reaction chamber 10 from an opening provided in the reaction chamber 10.

Similarly to the core burner 30, the glass source gas, the fuel gas, the oxygen gas, and the carrier gas are supplied to the cladding burner 40.

The glass source gas includes, for example, silicon tetrachloride (SiCl4).

In the cladding burner 40, glass particles are produced by an oxidation reaction or a hydrolysis reaction from the glass source gas within a combustion gas produced by combustion of the fuel gas and the oxygen gas.

In addition, the number of cladding burners 40 may be plural.

The reaction chamber 10 is disposed inside the booth 50.

The booth 50 has a space where clean air flows formed therein.

The booth 50 is provided with a partition plate 51 that partitions the inner space of the booth into a first space 50a and a second space 50b.

In addition, the first space 50a and the second space 50b are disposed in order toward the direction of gravitational force.

That is, the partition plate 51 is disposed at a vertical lower part of the reaction chamber 10.

The partition plate 51 is a part that forms a scaffold for a worker who enters the apparatus during the maintenance or cleaning of the optical fiber preform manufacturing apparatus 1.

The partition plate 51 has a plurality of through holes 51a that penetrates in a plate thickness direction.

That is, the plurality of through holes 51a is disposed so as to allow the first space 50a and the second space 50b to communicate with each other.

In addition, the plurality of through holes 51a in the present embodiment is formed over the whole surface of the partition plate 51.

The reaction chamber 10, the core burner 30, and the cladding burner 40 are disposed in the first space 50a of the booth 50.

Although not shown, the reaction chamber 10 is fixed to a side wall of the booth 50 or column 22.

In addition, the reaction chamber exhaust port 11 of the reaction chamber 10 is provided so as to pass through the side wall of the booth 50, and is configured so as to be able to discharge the air within the reaction chamber 10 to the outside without passing the air to the first space 50a.

The core burner 30 is fixed to the partition plate 51 via a first supporting member 31.

Although not shown, the cladding member 40 is fixed to the side wall of the booth 50.

The booth 50 is formed with a booth exhaust port 52.

The booth exhaust port 52 is provided in the booth 50 so as to communicate with the second space 50b, and discharges the gas with in the second space 50b to the outside.

A bottom face 53 is disposed vertically below the partition plate 51 in the booth 50.

The bottom face 53 constitutes a part of an inner surface that forms the second space 50b in the booth 50.

The air supply device 60 is a device that supplies clean air (air from which dust is removed by a filter or the like) to the first space 50a included in the booth 50.

As the air supply device 60 supplies clean air, the first space 50a is maintained at a cleanness of, for example, Class 1000.

The air supply device 60 in FIG. 1 is provided, at the top face of the booth 50 and near the top face at a side wall of the booth 50.

In addition, a configuration in which the air supply device is provided only at the top face of the booth 50 or only near the top face at the side wall of the booth 50 may be adopted, and the number of air supply devices 60 provided may be one.

An air supply port 61 for allowing the air supply device 60 to supply clean air to the first space 50a of the booth 50 is a hole that opens at a top plate or side wall of the booth 50, and a plurality of the air supply ports may be provided.

Additionally, the air supply port 61 is disposed above the core burner 30 and the cladding burner 40.

In other words, the clean air supplied from the air supply device 60 is supplied to the first space 50a through the air supply port 61, and passes through a position where the core burner 30 and the cladding burner 40 are disposed.

Moreover, the clean gas passes through the plurality of through holes 51a in the partition plate 51, and is introduced into the second space 50b.

That is, the air supply port 61, the core burner 30, and the cladding burner 40, and the partition plate 51 are disposed in a clean air channel.

The first exhaust device 70 is a device that discharges air within the second space 50b via the booth exhaust port 52.

The second exhaust device 80 is a device that suctions air in the reaction chamber 10 via the reaction chamber exhaust port 11.

In addition, since combustion gas, exhaust gas, and the like that are produced in the core burner 30 and the cladding burner 40 are contained in the air within the reaction chamber 10, it is preferable to provide the second exhaust device 80 with an exhaust gas purifying device or the like.

Next, a method of manufacturing an optical fiber porous preform S using the optical fiber preform manufacturing apparatus 1 in the present embodiment will be described.

By the operation of a drive device (not shown) provided in the column 22, the target member 20 moves upward from a vertical lower part while rotating around the central axis thereof.

As the target member 20 moves, the glass particles produced within the combustion gas of the core burner 30 and the cladding burner 40 are deposited in the axial direction at the tip (lower part) of the target member 20.

The core soot S1 is produced from the glass particles supplied from the core burner 30, and the cladding soot S2 is generated from the glass particles supplied from the cladding burner 40.

In addition, since the core burner 30 is provided vertically below the cladding burner 40, the core soot S1 is first produced at the tip (lower part) of the target member 20 that moves upward from the lower part, and the cladding soot S2 is then produced at an outer periphery of the core soot S1.

Accordingly, the porous preform S in which the core soot S1 is disposed at a central part and the cladding soot S2 is disposed at an outer peripheral portion is manufactured.

Next, the effect of suppressing the amount of dust within the reaction chamber 10 in the present embodiment will be described.

Clean air is supplied to the first space 50a from the air supply device 60.

Additionally, the second exhaust device 80 discharges air within the reaction chamber 10 to the outside of the booth 50 via the reaction chamber exhaust port 11, without being passed to the first space 50a.

Since an opening (not shown) is formed in the reaction chamber 10, the flow of clean air that goes into the reaction chamber 10 from the first space 50a is formed.

That is, the amount of dust within the reaction chamber 10 can be suppressed.

In addition, in a case where the opening is not provided in terms of the configuration of the apparatus, the advantages of the invention are exhibited also in a case where a gap is formed in terms of the structure of the reaction chambers 10.

When maintenance or cleaning of the optical fiber preform manufacturing apparatus 1 is performed, a worker performs maintenance or cleaning of the reaction chamber 10, the core burner 30, cladding burner 40, and the like within the booth 50.

By performing maintenance or cleaning, dust, such as soot powder, is generated within the booth 50, and the generated dust falls in the direction of gravitational force, and adheres to the top face of the partition plate 51.

However, since the partition plate 51 of the booth 50 in the present embodiment is formed with the plurality of through holes 51a that penetrates in the plate thickness direction, the dust adhering to the top face of the partition plate 51 can be dropped toward the second space 50b through the plurality of through holes 51a.

Accordingly, the dust in the top face of the partition plate 51 can be easily cleaned.

The dust that has fallen toward the second space 50b is deposited on the bottom face 53 of the booth 50.

On the other hand, in the related-art technique, dust may remain on the top face of the partition plate 51 even if the partition plate 51 is cleaned.

In this state, when manufacture of the porous preform S is started, and clean air is supplied to the first space 50a from the air supply device 60, there is a possibility that the flow of air is generated in the first space 50a, and the dust adhering to the partition plate 51 is lifted.

In contrast, according to the present embodiment, the partition plate 51 is formed with the plurality of through holes 51a.

Moreover, since the first exhaust device 70 is connected to the booth exhaust port 52, air within the second space 50b is discharged to the outside through the booth exhaust port 52 by the operation of the first exhaust device 70.

As the air within the second space 50b is discharged from the booth exhaust port 52, the flow of air that goes to the second space 50b from the first space 50a through the plurality of through holes 51a is generated.

That is, the air of the first space 50a can be made to flow to the second space 50b without being passed to the reaction chamber 10.

Even in a case where the dust adhering to the top face of the partition plate 51 is lifted, the dust flows along the flow of air that goes to the second space 50b from the first space 50a, and the dust moves to the second space 50b through the through holes 51a.

Accordingly, even in a case where manufacture of the porous preform S is started in a state where the dust has adhered to the partition plate 51, the amount of dust that enters the reaction chamber 10, and mixing of dust into the porous preform S during manufacture can be suppressed.

As described above, generation of air bubbles within an optical fiber preform obtained as transparent glass by heating the porous preform S can be suppressed.

Additionally, the clean air supplied from the air supply port 61 of the air supply device 60 is supplied to the first space 50a, and passes through a position where the core burner 30 and the cladding burner 40 are disposed.

Moreover, the clean gas passes through the plurality of through holes 51a in the partition plate 51, and is introduced into the second space 50b.

That is, the air supply port 61, the core burner 30, and the cladding burner 40, and the partition plate 51 are disposed in a clean air channel.

Accordingly, the core burner 30 and the cladding burner 40 are disposed in a channel for clean air that goes to the second space 50b from the air supply port 61, and the dust generated around the core burner 30 and the cladding burner 40 can be discharged toward the second space 50b.

In addition, since the plurality of through holes 51a are formed over the whole surface the partition plate 51, the flow of air that goes to the second space 50b from the first space 50a occurs over the whole surface of the partition plate 51.

Accordingly, the flow of air in the plurality of through holes 51a becomes a flow (laminar flow) that goes to the second space 50b from the first space 50a and is parallel to the vertical direction.

As a result, it is possible to prevent stagnation of air that may occur at a corner between a side wall and the partition plate 51 of the booth 50, around the first supporting member 31 that supports the core burner 30, or the like.

Accordingly, dust can be discharged to the second space 50b over the whole surface of the partition plate 51.

Additionally, since the flow of air that goes to the second space 50b from the first space 50a through a plurality of through holes 51a is generated, it is possible to prevent dust deposited on the bottom face 53 of the booth 50 from being lifted, and entering the first space 50a again.

Moreover, dust can be moved to the second space 50b through the plurality of through holes 51a, using the flow of air that goes to the second space 50b from the first space 50a.

Accordingly, even in a state where a large amount of dust still remains in the first space 50a after maintenance or cleaning, the dust can be quickly discharged to the second space 50b.

Hence, it is possible to shorten or eliminate a certain standby time (time for dropping dust) during which manufacture of the porous preform S cannot be started after maintenance or cleaning.

That is, the processing capacity of the porous preform S using the optical fiber preform manufacturing apparatus 1 can be improved.

By the way, in the manufacture of the porous preform S, combustion gas is produced from the core burner 30 and the cladding burner 40, and glass particles are produced by the heat of this combustion gas.

Since this combustion gas is introduced into the reaction chamber 10, the temperature of the inside of the reaction chamber 10 or the temperature of the first space 50a that communicates with the inside of the reaction chamber 10 rises.

That is, as the reaction chamber 10 and the booth 50 are heated, degradation caused by heat proceeds, there is a possibility that dust may be generated from the reaction chamber 10 or the booth 50 that has deteriorated.

Additionally, deformation or looseness may occur in the booth 50, the core burner 30, and the cladding burner 40 due to heating by the combustion gas.

Due to such deformation or looseness, the direction in which the glass particles in the core burner 30 and the cladding burner 40 are supplied may change, variations in quality and optical property or soot cracking in the porous preform S during manufacture may occur.

However, in the optical fiber preform manufacturing apparatus 1 of the present embodiment, the flow of air that goes to the second space 50b from the first space 50a where the core burner 30 and the cladding burner 40 are disposed through the plurality of through holes 51a is generated.

Therefore, since the heat of the combustion gas can be efficiently discharged toward the second space 50b, the heat deterioration of the reaction chamber 10 and the booth 50 can be suppressed.

That is, generation of dust that is caused by the heat deterioration can be suppressed.

Additionally, since the heat of the combustion gas can be efficiently discharged toward the second space 50b, heat deformation or looseness of the booth 50, the core burner 30, and the cladding burner 40 can be suppressed.

That is, quality variation, soot cracking, or the like in the porous preform S can be prevented and suppressed.

Moreover, although a transparent member is generally used for the booth 50, a plastic plate (an acrylics plate or a vinyl chloride plate) that has high thermal resistance, but is inexpensive may be used as the material of this member.

In this case, it is possible to reduce the apparatus cost of the optical fiber preform manufacturing apparatus 1.

In addition, although the partition plate 51 in the present embodiment is disposed at the vertical lower part of the reaction chamber 10, the partition plate is not limited to such a configuration.

A configuration in which the partition plate 51 is provided at a position that is not the vertical lower part of the reaction chamber 10 may be adopted.

Even in such a configuration, if the dust adhering to the partition plate 51 can be discharged to the second space 50b from the first space 50a without passing the dust to the reaction chamber 10, the amount of dust that enters the reaction chamber 10 can be reduced, and the generation of air bubbles in a manufactured optical fiber preform can be suppressed.

Additionally, although the optical fiber preform manufacturing apparatus 1 in the present embodiment is a manufacturing apparatus using the VAD method, the invention is not limited to this method, and an optical fiber preform manufacturing apparatus using an outside vapor phase deposition method may be used.

Figure 2:
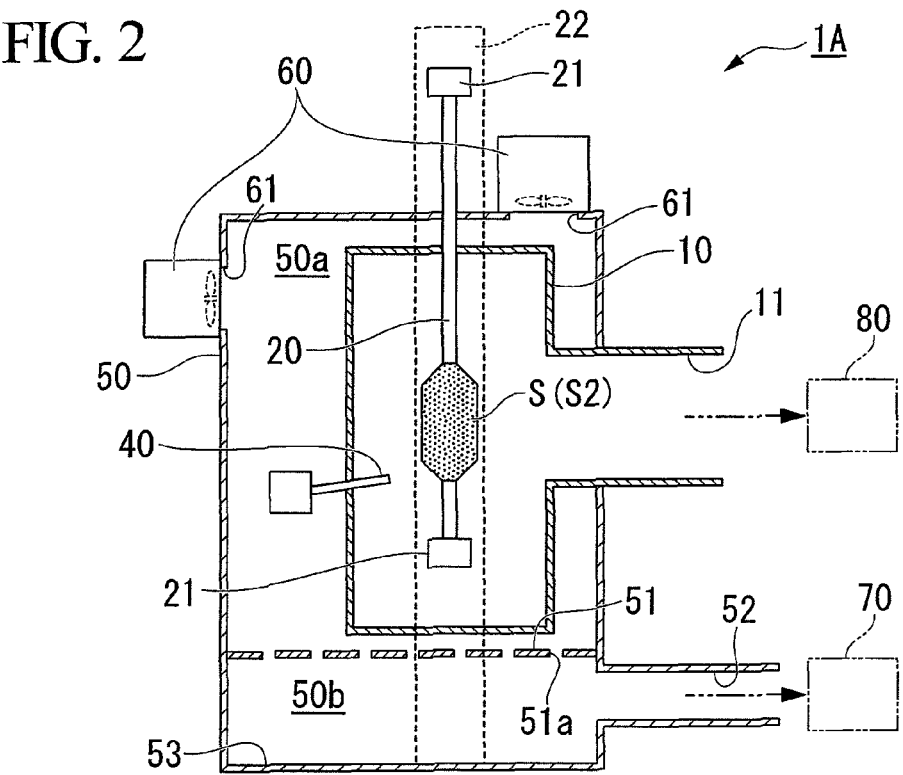
FIG. 2 is a vertical cross-sectional view showing the schematic configuration of an optical fiber preform manufacturing apparatus using an outside vapor phase deposition method in the first embodiment of the invention.

FIG. 2 is a vertical cross-sectional view showing the schematic configuration of an optical fiber preform manufacturing apparatus 1A using an outside vapor phase deposition method, in the present embodiment.

In addition, in FIG. 2, the same elements as those of the optical fiber preform manufacturing apparatus 1 shown in FIG. 1 will be designated by the same reference numerals, and the description thereof will be omitted.

In the optical fiber preform manufacturing apparatus 1A shown in FIG. 2, the target member 20 is provided inside the reaction chamber 10.

In the outside vapor phase deposition method, glass particles are deposited around the target member 20.

The target member 20 is rod-shaped glass that is formed from a core or a part of the core and cladding, or is a dummy member that is drawn out afterward.

A plurality of the cladding burners 40 may be provided.

Additionally, a raw material for a dopant, such as germanium tetrachloride (GeCl4), may be supplied to the cladding burner 40 if needed.

As described above, according to the present embodiment, there are advantages in that the dust within the booth 50 can be discharged without being passed to the reaction chamber 10, and the dust can be suppressed from entering into the reaction chamber 10, whereby the generation of air bubbles in an optical fiber preform can be suppressed.

<Second Embodiment>

Figure 3:
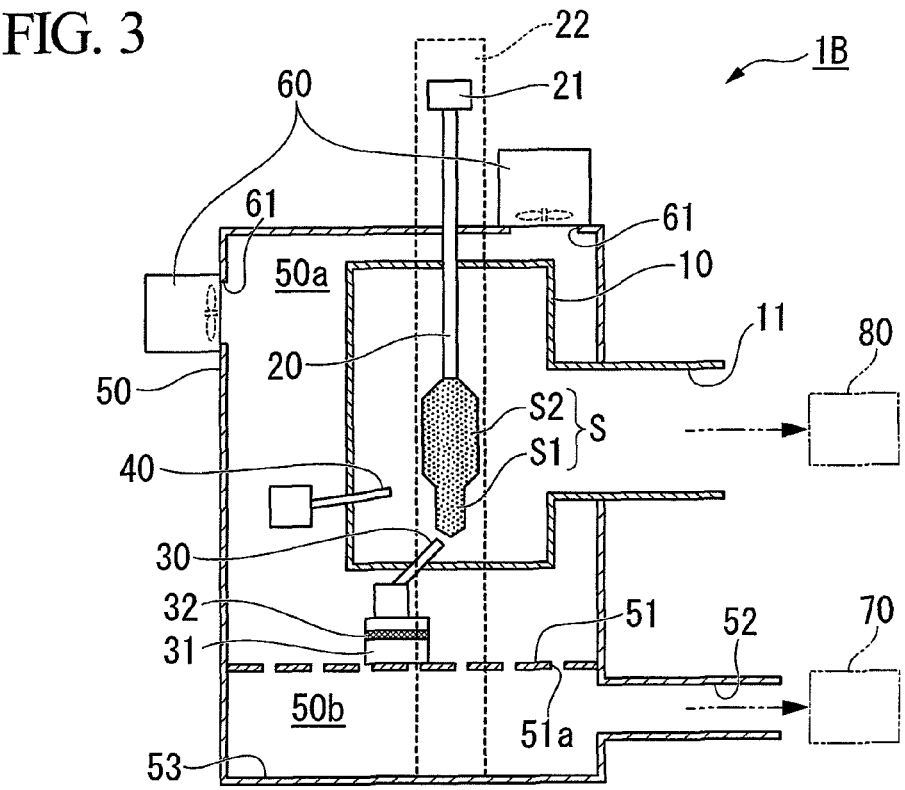
FIG. 3 is a vertical cross-sectional view showing the schematic configuration of an optical fiber preform manufacturing apparatus using the VAD method in a second embodiment of the invention.

FIG. 3 is a vertical cross-sectional view showing the schematic configuration of an optical fiber preform manufacturing apparatus 1B using the VAD method, in the present embodiment.

In addition, in FIG. 3, the same elements as those of the first embodiment shown in FIG. 1 will be designated by the same reference numerals, and a description thereof will be omitted.

The core burner 30 in the present embodiment is disposed at the partition plate 51 via the first supporting member 31.

Additionally, the first supporting member 31 is adapted to pinch an elastic member 32.

The elastic member 32 is a member that is formed from rubber or resin having elasticity, absorbs vibration when the partition plate 51 vibrates, and suppresses the vibration of the core burner 30.

Since the partition plate 51 is formed with the plurality of through holes 51a, the rigidity thereof is low compared to a case where there is no through hole 51a.

Therefore, there is a possibility that the vibration of the partition plate 51 may occur, with the operation of a device (for example, the air supply device 60) provided in the booth 50.

When a partition plate 51 vibrates, there is a possibility that the core burner 30 fixed to the partition plate 51 via the first supporting member 31 may vibrate, the supply direction of glass particles from the core burner 30 to the target member 20 may not be stabilized, and quality variation in the manufactured optical fiber porous preform S may occur.

However, since the first supporting member 31 in the present embodiment is provided with the elastic member 32, and even in a case where the partition plate 51 vibrates, the elastic member 32 absorbs the vibration of the partition plate, and vibration of the core burner 30 can be prevented and suppressed.

Hence, according to the present embodiment, there is an advantage in that the quality of the porous preform S is stabilized by preventing and suppressing the vibration of the core burner 30.

<Third Embodiment>

Figure 4:
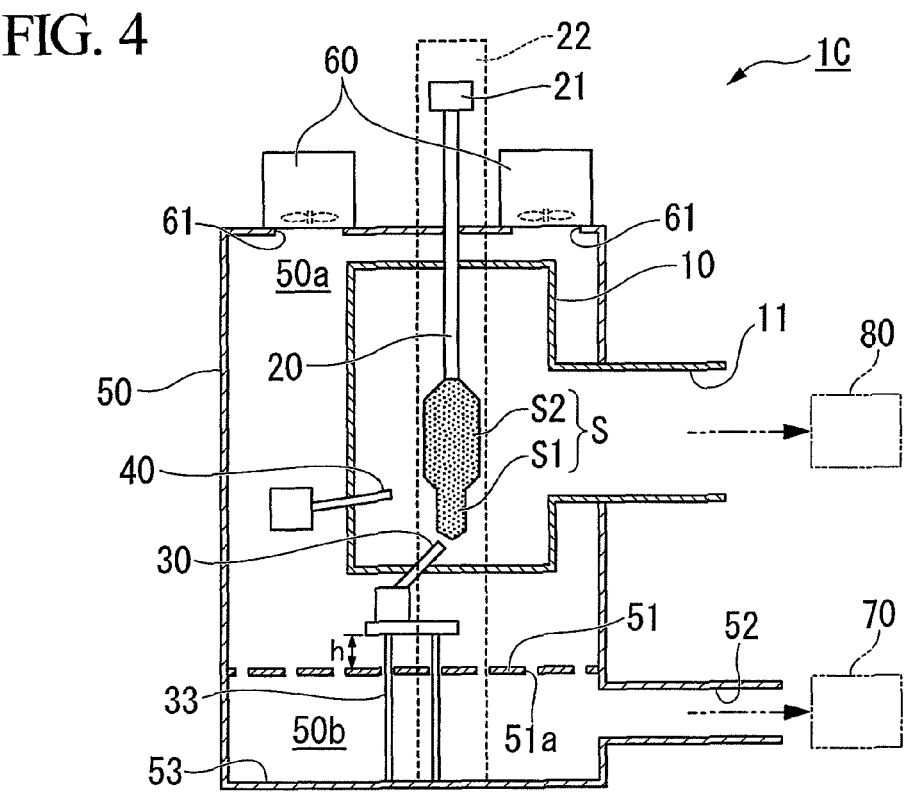
FIG. 4 is a vertical cross-sectional view showing the schematic configuration of an optical fiber preform manufacturing apparatus using the VAD method in a third embodiment of the invention.

FIG. 4 is a vertical cross-sectional view showing the schematic configuration of an optical fiber preform manufacturing apparatus 1C using a VAD method, in the present embodiment.

In addition, in FIG. 4, the same elements as those of the first embodiment shown in FIG. 1 will be designated by the same reference numerals, and a description thereof will be omitted.

The core burner 30 in the present embodiment is fixed to the bottom face 53 of the booth 50 via a second supporting member 33.

The second supporting member 33 is formed by a plurality of rod-shaped members that extends in the vertical direction, and the rod-shaped members are inserted through the through holes 51a of the partition plate 51 in a non-contact state.

That is, the second supporting member 33 is disposed on the bottom face 53 in a non-contact state with the partition plate 51.

Additionally, spacing designated by a reference numeral h is formed between the core burner 30 and the partition plate 51.

Since the second supporting member 33 is not in contact with the partition plate 51, even in a case where the partition plate 51 vibrates, the vibration is not transmitted to the second supporting member 33.

As a result, it is possible to prevent the vibration of the core burner 30.

Hence, according to the present embodiment, there are advantages in that the vibration of the core burner 30 can be prevented, and the quality of the porous preform S is stabilized.

Additionally, since the spacing h is formed between the core burner 30 and the partition plate 51, there is an advantage in that the periphery of the core burner 30 can be easily cleaned.

Moreover, there are advantages in that stagnation in the flow of air that goes to the second space 50b from the first space 50a can be suppressed around the core burner 30, and deposition of dust around the core burner 30 can be prevented and suppressed.

In addition, although the second supporting member 33 in the present embodiment is fixed to the bottom face 53, the invention is not limited thereto.

A configuration in which the second supporting member is fixed to a side wall of the booth 50 may be adopted.

<Fourth Embodiment>

Figure 5:
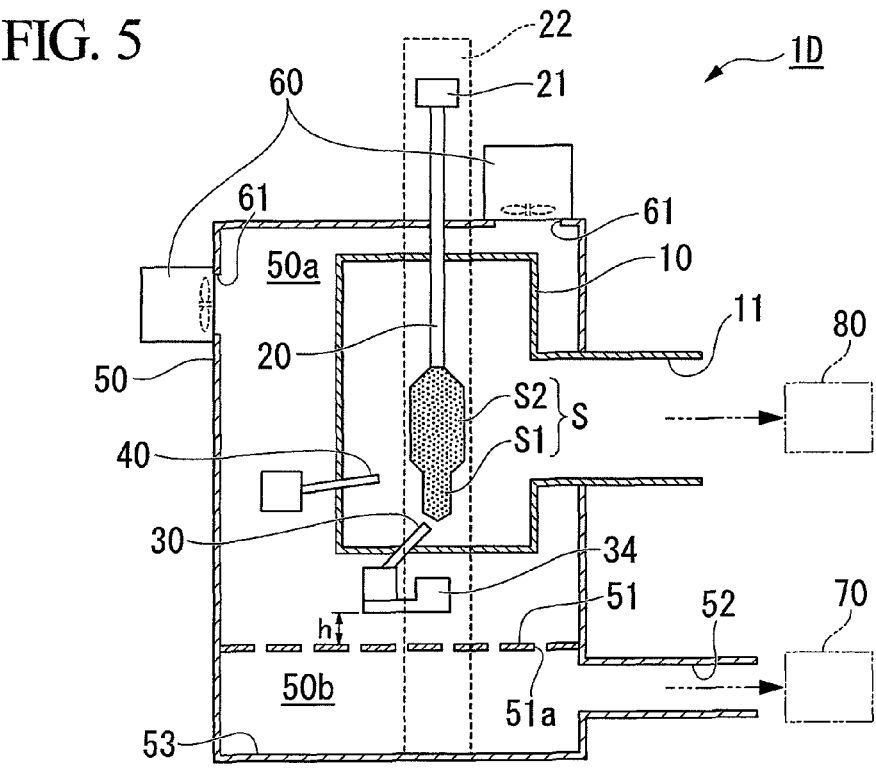
FIG. 5 is a vertical cross-sectional view showing the schematic configuration of an optical fiber preform manufacturing apparatus using the VAD method in a fourth embodiment of the invention.

FIG. 5 is a vertical cross-sectional view showing the schematic configuration of an optical fiber preform manufacturing apparatus 1D using the VAD method, in the present embodiment.

In addition, in FIG. 5, the same elements as those of the first embodiment shown in FIG. 1 will be designated by the same reference numerals, and the description thereof will be omitted.

The core burner 30 in the present embodiment is fixed to the column 22 disposed outside the booth 50 via a third supporting member 34.

Although not shown, the third supporting member 34 is provided so as to pass through a side wall of the booth 50.

Additionally the third supporting member 34 is in non-contact with the partition plate 51.

Additionally, spacing designated by a reference numeral h is formed between the core burner 30 and the partition plate 51.

Since the third supporting member 34 is in non-contact with the partition plate 51, even in a case where the partition plate 51 vibrates, the vibration is not transmitted to the third supporting member 34.

As a result, it is possible to prevent the vibration of the core burner 30.

Hence, according to the present embodiment, there are advantages in that the vibration of the core burner 30 can be prevented, and the quality of the porous preform S is stabilized.

Additionally, since the spacing h is formed between the core burner 30 and the partition plate 51, there is an advantage in that the periphery of the core burner 30 can be easily cleaned.

Moreover, there are advantages in that stagnation in the flow of air that goes to the second space 50b from the first space 50a can be suppressed around the core burner 30, and deposition of dust around the core burner 30 can be prevented and suppressed.

<Fifth Embodiment>

Figure 6:
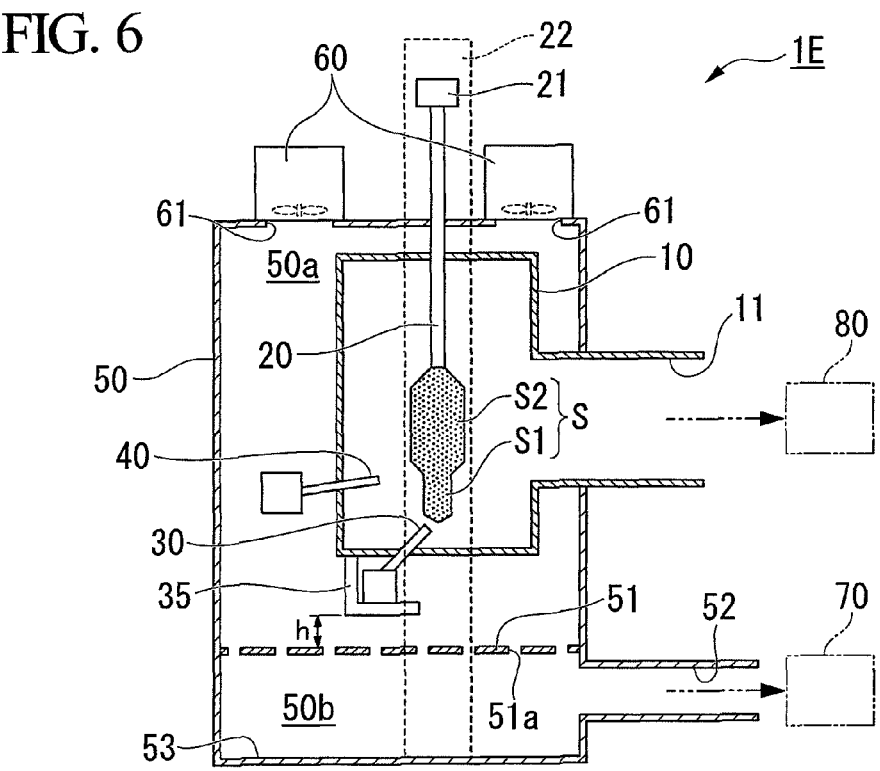
FIG. 6 is a vertical cross-sectional view showing the schematic configuration of an optical fiber preform manufacturing apparatus using the VAD method in a fifth embodiment of the invention.
Figure 7:
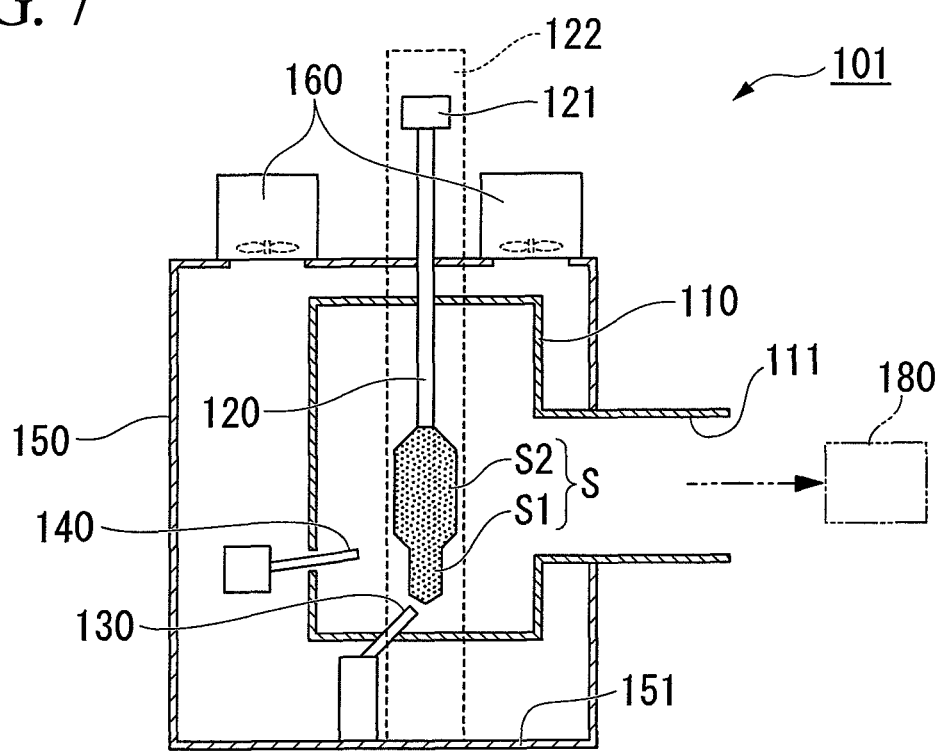
FIG. 7 is a vertical cross-sectional view showing the schematic configuration of a related-art optical fiber preform manufacturing apparatus using the VAD method.

FIG. 6 is a vertical cross-sectional view showing the schematic configuration of an optical fiber preform manufacturing apparatus 1E using a VAD method, in the present embodiment.

In addition, in FIG. 6, the same elements as those of the first embodiment shown in FIG. 1 will be designated by the same reference numerals, and the description thereof will be omitted.

The core burner 30 in the present embodiment is fixed to the outer surface of the reaction chamber 10 via a fourth supporting member 35.

In addition, the reaction chamber 10 is in the state of non-contact with the partition plate 51, and is fixed to a side wall or column 22 of the booth 50.

Therefore, the fourth supporting member 35 is in non-contact with the partition plate 51.

Additionally, spacing designated by a reference numeral h is formed between the core burner 30 and the partition plate 51.

Since the fourth supporting member 35 is in non-contact with the partition plate 51, even in a case where the partition plate 51 vibrates, the vibration is not transmitted to the fourth supporting member 35.

As a result, it is possible to prevent the vibration of the core burner 30.

Hence, according to the present embodiment, there are advantages in that the vibration of the core burner 30 can be prevented, and the quality of the porous preform S is stabilized.

Additionally, since the spacing h is formed between the core burner 30 and the partition plate 51, there is an advantage in that the periphery of the core burner 30 can be easily cleaned.

Moreover, there are advantages in that stagnation in the flow of air that goes to the second space 50b from the first space 50a can be suppressed around the core burner 30, and deposition of dust around the core burner 30 can be prevented and suppressed.

EXAMPLES

In each of apparatuses shown in Table 1, after a soot preform was manufactured, the soot preform was subjected to dehydration and transparent vitrification, whereby an optical fiber preform with an external diameter of □100 mm and an effective length of 1000 mm was obtained.

As for a case where the standby time until manufacture is started after cleaning is set to 2 hours and a case where manufacture is started immediately after the end of cleaning, five preforms were manufactured at a time, respectively, and the average number of bubbles of the five preforms was counted.

Additionally, the number of bubbles of the preforms manufactured immediately after soot cracking occurred was counted.

The highest temperature at a side wall of the booth 50 was also measured.

Additionally, changes in MFD (Mode Field Diameter) expected when optical fibers were fabricated by attaching cladding of a set scale factor to the manufactured preforms were estimated from the test results of refractive index profiles of the preforms.

This was calculated on the basis of Comparative Example 1.

In addition, as shown in Table 1, the amount of supply of clean air supplied from the air supply device 60 is adjusted.

This was calculated on the basis of Comparative Example 1.

TABLE 1

|  | Apparatus used | Amount of supply of clean air (on the basis of Comparative Example 1) | Aperture ratio of through holes 51a to area of partition plate 51 | Number of bubbles in optical fiber preform | | | Highest temperature of side wall of booth/ °C. | Change in MFD in one preform (on the basis of Comparative Example 1) |
| --- | --- | --- | --- | --- | --- | --- | --- | --- |
|  |  |  |  | Average number of bubbles of five preforms when manufacture is started after being left for 2 hours after cleaning | Average number of bubbles of five preforms when manufacture is started immediately after cleaning | Number of bubbles in preform immediately after occurrence of soot cracking |  |  |
| Comparative Example 1 | 101 | 1.0 Times | — | 1.4 | 3.0 | 12 | 91 | 1.0 |
| Comparative Example 2 | 101 | 1.5 Times | — | 1.4 | 1.8 | 7 | 76 | 2.2 |
| Example 1 | 1 | 1.5 Times | 36% | 1.0 | 1.2 | 2 | 75 | 0.8 |
| Example 2 | 1 | 1.9 Times | 74% | 0.4 | 0.8 | 1 | 60 | 1.0 |
| Example 3 | 1B | 1.9 Times | 74% | 0.6 | 0.4 | 0 | 60 | 0.8 |
| Example 4 | 1C | 1.9 Times | 74% | 0.4 | 0.6 | 0 | 61 | 0.8 |
| Example 5 | 1D | 1.9 Times | 74% | 0.0 | 0.0 | 0 | 60 | 0.8 |

The above examples will be discussed.

When Example 1 using the apparatus of the invention is compared with Comparative Example 1 and Comparative Example 2 using the related-art apparatus, in Example 1, MFD changes do not become large even if the amount of supply of clean air is increased, and become smaller than Comparative Example 1.

Thus, the effect of countermeasures against heat is seen.

Additionally, in Example 1, air bubbles in a preform manufactured immediately after cleaning or a preform manufactured immediately after soot cracking decrease.

Thus, the effect of reduction in bubbles is also seen.

Hence, deposition of glass particles was not affected by using the apparatus of the invention, but the effect of reducing air bubbles was obtained.

Additionally, in Comparative Example 1, it was observed that a side wall of the booth 50 was distorted due to heat at the time when approximately 100 preforms were produced, and the number of bubbles of the preform also showed a tendency to increase.

When the cleanness in the booth 50 at that time was measured, the cleanness had fallen to approximately class 3500, whereas normal cleanness is less than class 1000.

On the other hand, in Example 1, even if 100 preforms were produced, the distortion of a side wall of the booth 50 and so on was not seen, and the number of bubbles did not increase.

Subsequently, Example 1, Example 2, and Example 3 will be compared with each other.

In Example 2 and Example 3, the amount of supply of clean air was set to be greater than that of Example 1.

Additionally, in Example 2 and Example 3, the opening area of the through holes 51a was configured to be wider than that of Example 1, and the amount of ventilation of clean air was increased.

Here, the ratio (aperture ratio) of the opening area of the through holes 51a to the area of the partition plate 51 used for Example 1 was 36%, whereas the aperture ratio of Example 2 and Example 3 was 74%.

Although the tendency that MFD changes become slightly large compared to Example 1 was seen in Example 2, the above tendency was not seen in Example 3 in which the elastic member 32 is installed in the first supporting member 31.

Hence, in Example 3, even if the opening area of the partition plate 51 was made large and the ventilation amount of clean air was increased, characteristic changes caused by the vibration of the core burner did not occur.

Subsequently, Example 1, Example 2, and Example 4 will be compared with each other.

In Example 4, the amount of supply of clean air and the aperture ratio were configured to be the same as those of Example 2.

Although the tendency that MFD changes become slightly large compared to Example 1 was seen in Example 2, the above tendency was not seen in Example 4 in which the core burner 30 is fixed to the bottom face 53 of the booth 50 via the second supporting member 33.

Hence, in Example 4, even if the opening area of the partition plate 51 was made large and the ventilation amount of clean air was increased, characteristic changes caused by the vibration of the core burner 30 did not occur.

According to Example 5 in which the core burner 30 is fixed to the column 22 disposed outside the booth 50 via the third supporting member 34, the bubble reducing effect was further increased.

Although the optical fiber preform manufacturing apparatus and the optical fiber preform manufacturing method have been described above, the invention is not limited thereto, and can be appropriately changed without departing from the concept of the invention.

The present invention can be widely applied to an optical fiber preform manufacturing apparatus and an optical fiber preform manufacturing method.

While preferred embodiments of the invention have been described and illustrated above, it should be understood that these are exemplary of the invention and are not to be considered as limiting.

Additions, omissions, substitutions, and other modifications can be made without departing from the scope of the present invention.

Accordingly, the invention is not to be considered as being limited by the foregoing description, and is only limited by the scope of the appended claims.

What is claimed is:

1. An optical fiber preform manufacturing apparatus comprising:
    a booth;
    a reaction chamber disposed inside the booth;
    a target member disposed within the reaction chamber;
    a burner that deposits glass particles on the target member;
    a partition plate that partitions the internal space of the booth into a first space where the reaction chamber and the burner are disposed and a second space, and that has a plurality of through holes that allows the first space and the second space to communicate with each other, the plurality of through holes being formed over the whole surface of the partition plate;
    an air supply unit that supplies clean air into the first space; and
    an exhaust unit that discharges air within the second space, wherein
    the first space and the second space are arranged in order toward the direction of gravitational force, and
    the air supply unit is adjacent to the first space and disposed above the burner, and flow of air supplied from the air supply unit goes to the second space from the first space.

2. The optical fiber preform manufacturing apparatus according to claim 1, further comprising a plurality of the burners,
    wherein a part of the burners is disposed at the partition plate via a first supporting member, and
    wherein the first supporting member includes an elastic member.

3. The optical fiber preform manufacturing apparatus according to claim 1, further comprising a plurality of the burners,
    wherein a part of the burners is fixed to an inner surface of the booth that forms the second space via a second supporting member.

4. The optical fiber preform manufacturing apparatus according to claim 1, further comprising a plurality of the burners,
    wherein a part of the burners is fixed to a rigid member disposed outside the booth via a third supporting member.

5. The optical fiber preform manufacturing apparatus according to claim 1, further comprising a plurality of the burners,
    wherein a part of the burners is fixed to an outer surface of the reaction chamber via a fourth supporting member.

6. An optical fiber preform manufacturing method using an optical fiber preform manufacturing apparatus, the optical fiber preform manufacturing apparatus comprising:
    a booth;
    a reaction chamber disposed inside the booth;
    a target member disposed within the reaction chamber;
    a burner that deposits glass particles on the target member;

a partition plate that partitions the internal space of the booth into a first space where the reaction chamber and the burner are disposed and a second space, and that has a plurality of through holes that allows the first space and the second space to communicate with each other, the plurality of through holes being formed over the whole surface of the partition plate;

an air supply unit that supplies clean air into the first space; and an exhaust unit that discharges air within the second space; the method comprising:

passing the air through a position where the burner is disposed after being supplied to the first space; passing the air through the plurality of through holes in the partition plate; and manufacturing an optical fiber preform while introducing the air into the second space.

* * * * *